(12) United States Patent
Rosaen

(10) Patent No.: US 8,464,464 B2
(45) Date of Patent: Jun. 18, 2013

(54) EDGING GUIDE

(76) Inventor: Lars Rosaen, Plymouth, MI (US)

( * ) Notice: Subject to any disclaimer, the term of this patent is extended or adjusted under 35 U.S.C. 154(b) by 0 days.

(21) Appl. No.: 12/027,749

(22) Filed: Feb. 7, 2008

(65) Prior Publication Data

US 2009/0199466 A1   Aug. 13, 2009

(51) Int. Cl.
  *A01G 1/08*   (2006.01)
(52) U.S. Cl.
  USPC ............................................................. 47/33
(58) Field of Classification Search
  USPC .................................. 47/33; 52/102; 256/19
  See application file for complete search history.

(56) References Cited

U.S. PATENT DOCUMENTS

| | | | | |
|---|---|---|---|---|
| 3,921,356 A | * | 11/1975 | Hughes | ............................ 52/299 |
| 4,012,159 A | * | 3/1977 | Berry | .............................. 404/68 |
| 4,508,319 A | | 4/1985 | Tappan et al. | |
| 4,702,034 A | | 10/1987 | Ferguson et al. | |
| 5,230,187 A | | 7/1993 | Reimann et al. | |
| 5,291,708 A | * | 3/1994 | Johnson | ........................ 52/282.2 |
| 5,809,700 A | * | 9/1998 | Roush et al. | .......................... 52/4 |
| 5,826,372 A | | 10/1998 | Parsons | |
| 5,852,895 A | * | 12/1998 | Sinanan | ............................. 47/33 |
| 5,901,526 A | * | 5/1999 | Vidmar et al. | ............. 52/745.09 |
| 5,913,781 A | * | 6/1999 | Vidmar et al. | .................. 52/102 |
| 5,934,821 A | * | 8/1999 | Shaw et al. | ...................... 404/62 |
| 5,941,018 A | | 8/1999 | Herrema | |
| 6,202,367 B1 | * | 3/2001 | Marino et al. | .................. 52/102 |
| 6,402,117 B1 | * | 6/2002 | Tsai | .............................. 248/530 |
| 7,434,360 B2 | * | 10/2008 | Traub et al. | ...................... 52/102 |

FOREIGN PATENT DOCUMENTS

| | | | |
|---|---|---|---|
| GB | 389110 | | 3/1933 |
| GB | 635938 | | 4/1950 |
| JP | 2003116344 A | * | 4/2003 |
| WO | WO 9637659 A1 | * | 11/1996 |

\* cited by examiner

*Primary Examiner* — Son T Nguyen
(74) *Attorney, Agent, or Firm* — Gifford, Krass, Sprinkle, Anderson & Citkowski, P.C.

(57) ABSTRACT

An edging guide may include an anchor and a retailer that may be rotatably mounted to the anchor. The anchor may be buried in the ground during use and may include a post portion and a support portion. The retailer may be rotatably mounted to the support of the anchor and may function to secure hold one or more lengths of edging material.

13 Claims, 5 Drawing Sheets

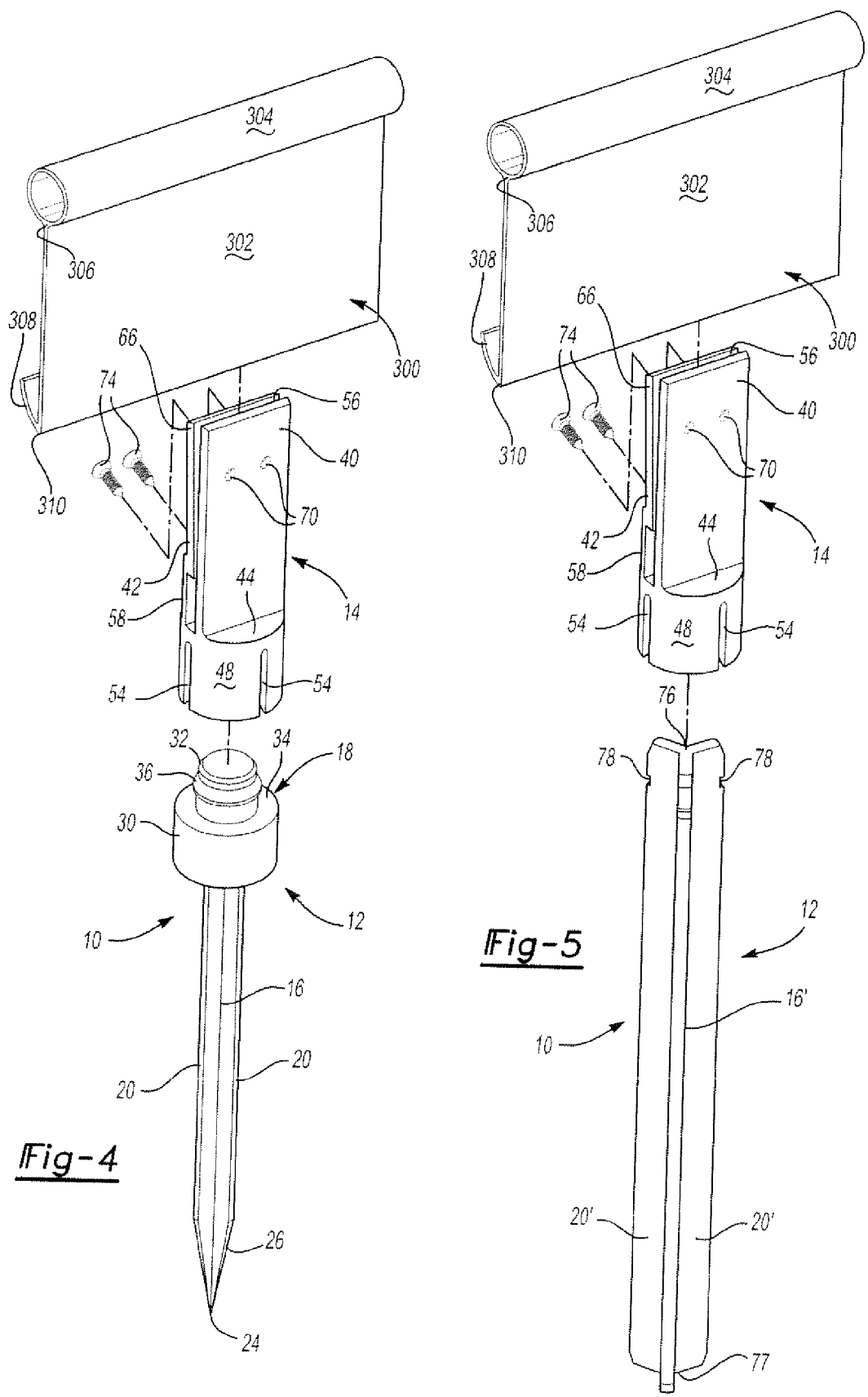

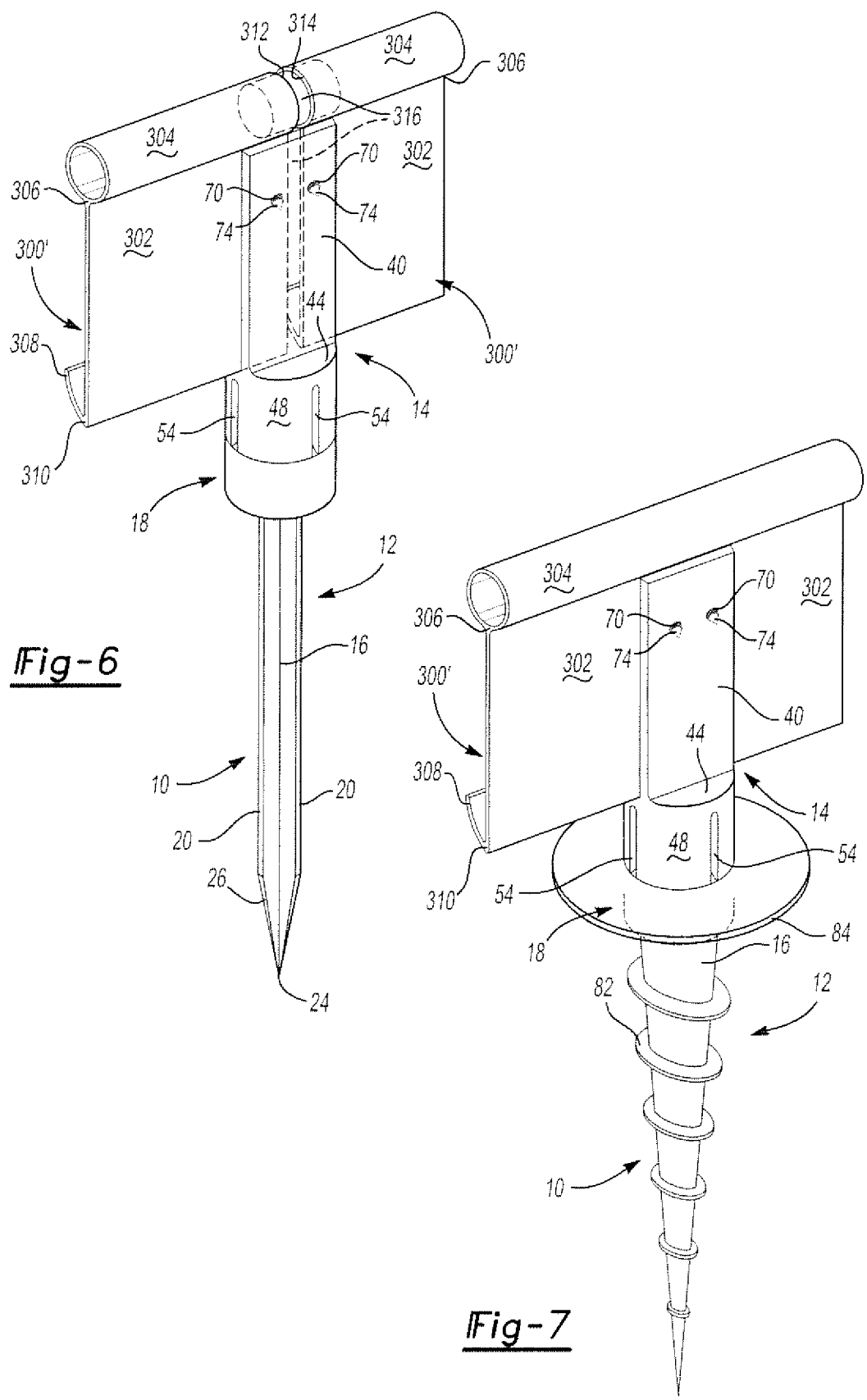

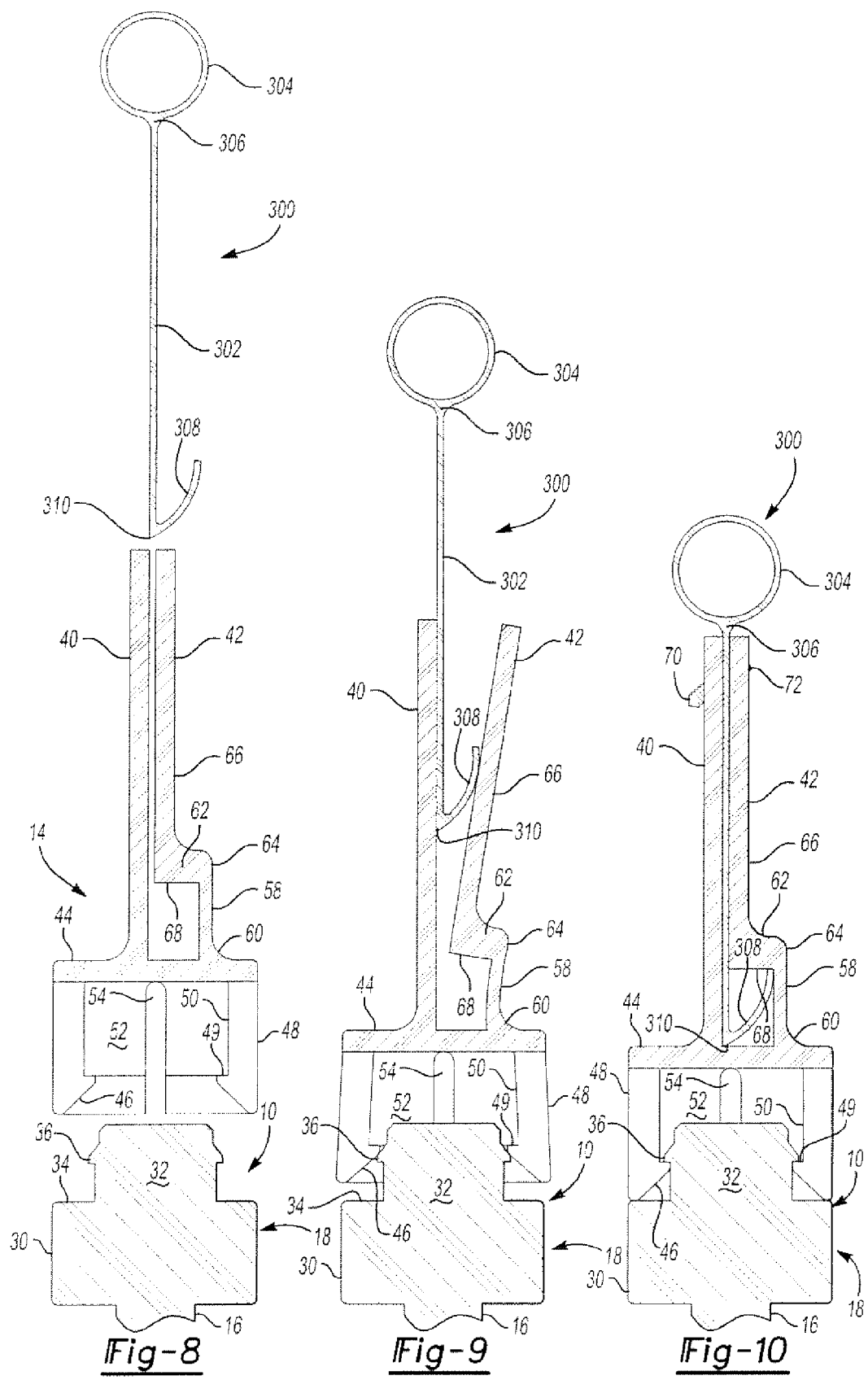

EDGING GUIDE

BACKGROUND OF THE INVENTION

1. Field of the Invention

Disclosed herein is an embodiment for an edging guide. More specifically, disclosed herein is a guide for use with garden edging or the like. The guide may include an anchor and a retainer. The anchor may positioned in the ground. The retainer may be rotatably positioned on the anchor and may function to retain one or more lengths of edging material.

2. Reference to Related Art

Garden edging is typically used in residential and commercial applications as a barrier between a garden bed and an adjacent bed or a lawn. Such edging may be constructed as an elongated plastic panel having a tube positioned along one edge of the panel and a look positioned along an opposite edge. The tube may be used as a handhold during the installation process, and it is often the only part of the edging that is visible after the edging has been installed. The hook may open upwardly toward the tube of edge.

A common problem with available edging material is that, over time, pressure resulting from the heating and freezing, of the ground, plus moisture from rain, will combine to slowly work the edging material out of the ground. This, of course, is a particular undesired result given the amount of time and effort required to properly install the edging in the first place. To that end, the upwardly open hook of the edging material may be successful in delaying the dislodging of the material, but it does not prevent it.

Accordingly there is a need for a supplemental anchoring system for an edging panel that can counter the environmental factors at work and retain the edging in position. It would also be advantageous to have an edging retainer or guide apparatus that provides the user with the ability to easily adjust the position of the edging, especially during setup.

SUMMARY OF THE INVENTION

An edging guide that may include an anchor and a retainer that maw be rotatably mounted to the anchor. The anchor may be buried in the ground during use and may include a post portion and a support portion. The retainer may be rotatably mounted to the support of the anchor and function to hold one or more portions of edging material. The edging material and the edging guide may be constructed from molded plastic using known methods. However, the edging guide or the individual components of the edging guide, and the edging itself may be constructed from various other polymers, metals (e.g., stainless steel aluminum, or like metal) or coated metal surfaces that are resistant to rust or corrosion.

BRIEF DESCRIPTION OF THE DRAWINGS

Reference will now be had to the attached drawings, wherein like referenced numerals refer to like parts throughout, and wherein:

FIG. 4 is an exploded rear perspective view of the edging guide of FIG. 1;

FIG. 5 is an exploded rear perspective view an edging guide having an alternative embodiment of an anchor;

FIG. 6 is a rear perspective view of the edging, guide shown in FIG. 1 being used to secure two separate sections of edging material to a single retainer;

FIG. 7 is a rear perspective view an edging: guide having an another alternative embodiment of an anchor;

FIG. 8 is a side cutaway view of the edging retainer and a portion of the anchor wherein the edging material is arranged for insertion into the retainer;

FIG. 9 is a cutaway view of the edging retainer wherein the edging material is being inserted into the retainer; and FIG. 10 is a side cutaway view showing the edging material inserted in and secured to the retainer.

DETAILED DESCRIPTION

Figure 1:
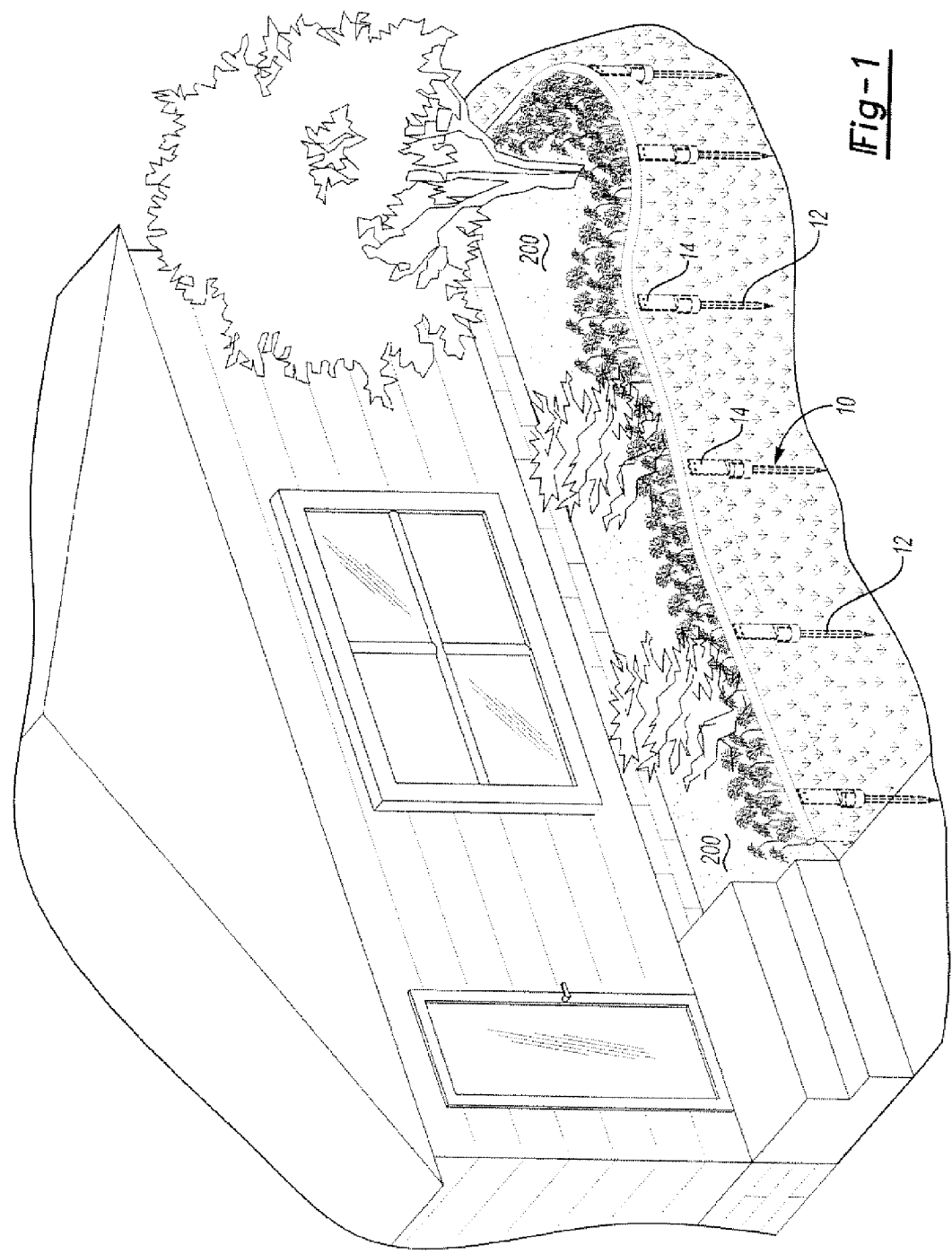
FIG. 1 is an environmental perspective view showing a plurality, of edging guides retaining multiple lengths of edging material.

Referring now to FIGS. 1 through 4, an edging guide 10 may include an anchor 12 and a retainer 14. The anchor 12 may be buried in the ground 200 during use and may include a post 16 portion and a support portion 18. The retainer 14 may be rotatably mounted to the support 18 of the anchor 12 and function to hold one or more portions of edging material 300. The edging material 300 may include an elongated plastic panel 302 having a tube positioned 304 along one edge 306 of the panel 302 and a hook 308 positioned along an opposite edge 310.

The edging material 300 and the edging guide 10 may be constructed from molded plastic using known methods. However, the edging guide 10, or the individual components of the edging guide 10, and the edging material 300 may be constructed from various other polymers, metals (e.g., stainless steel, aluminum, or like metal) or coated metal surfaces that are resistant to rust or corrosion.

Still referring to FIGS. 1 through 4, the post 16 of the anchor 12 may have an X-shaped cross-section formed from four elongated flanges 20 that may extend radially from a center axis 22 of the post 16. The flanges 20 may be tapered together to form a point 24 at one end 26 of the post 16. The support 18 may be positioned on an end 28 of the post 16 opposite the point 24.

Still referring to FIGS. 1 through 4, the support 18 may include a base 30 with a cylindrical pin 32 that extends upwardly from the center of a top surface 34 of the support 18. A flange or lip 36 may extend concentrically around the pin 32 and, as will be described below, may be used to rotatably secure the retainer 14 to the support 18.

Still referring to FIGS. 1 through 4 and 8 through 10, the retainer 14 may include a base 38 and a pair of retainer plates 40, 42. The base 38 of the retainer 14 may include an upper surface 44, a bottom surface 46, and a sidewall having an exterior 48 and interior 50 surfaces. The interior surface 50 of the base 38 (or alternatively the bottom surface 46) may define a recess 52 that, as will be described below, may be fitted to the pin 32 of the support 18. To that end, the bottom surface 46 of the base 38 may be tapered upward toward the recess 52 to form a catch 49 or flange that may operate to engage the lip 36 of the pin 32. One or more grooves 54 may also extend through the sidewall to the recess 59 such that the sidewall may flex to fit over the pin 32 of the support 18.

Figure 2:
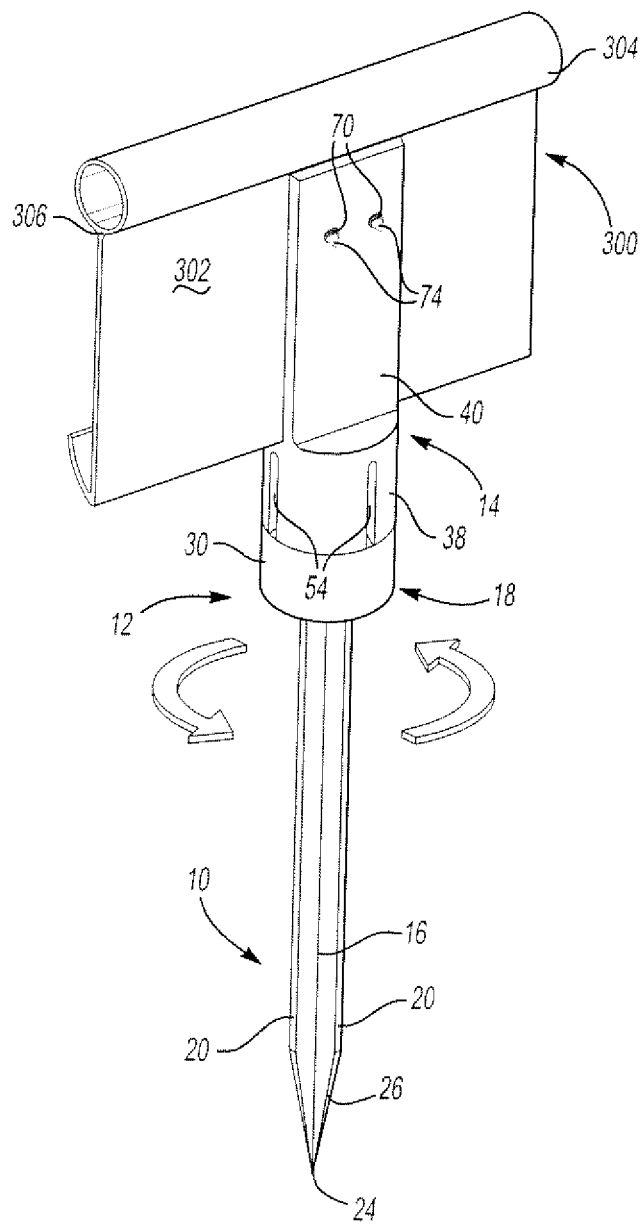
FIG. 2 is a rear perspective view of the edging guide shown in use in FIG. 1.
Figure 3:
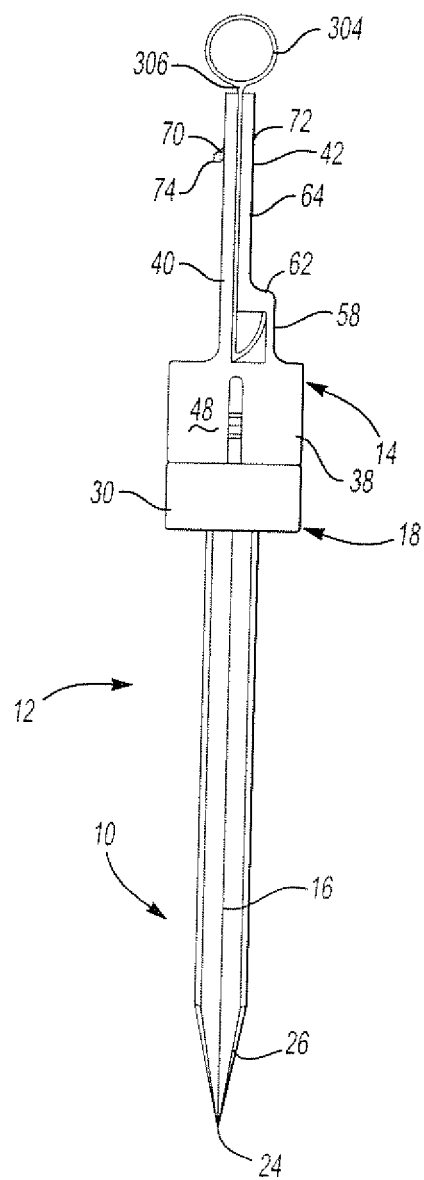
FIG. 3 is a planar side view of the edging guide shown in FIG. 1.

Referring now to FIGS. 1 through 4 and 8 through 10, the plates 40, 42 of the retainer 14 may include a first 40 and a second 42 plate. Each plate 40, 42 may be spaced a predetermined distance from the other to form a channel 56 therebetween, and may also extend substantially vertically from an upper surface 44 of the base 38 of the retainer 14. More specifically, the first plate 40 may be substantially rectangular in form and extend lengthwise from the upper surface 44 of the base 38. Further, as shown in FIG. 4, the second plate 42 may include a first portion 58 that is flexibly mounted at one end 60 to the upper surface 44 of the base 38, a generally horizontal cross-piece 62 that that extends horizontally from an opposite end 64 of the first portion 58 toward the first plate 40, and a second portion 66 that may extend substantially vertically from the other end 68 of the cross-piece 62. Accordingly, the first portion 58 and cross-piece 62 of the second plate 42 may function to enlarge the channel 56 into an opening, (as will be described below) large enough to accommodate the hook 308 of the edging material 308. As shown in FIGS. 2-3, each plate 40, 42 may also include a pair of aperture 70, 72 for use in fastening one or more lengths of edging material 300 to a retainer 14. The apertures 70 of one plate 40 may be vertically offset from those 72 of the other plate 42 such that any fasteners 74 used may be placed in a downwardly or diagonally directed orientation. It may also be appreciated that the downward orientation the fasteners 74 aids in preventing unwanted dislodging of the edging material 300 and aids installation in narrow or confined spaces.

Referring now to FIGS. 1 through 4 and to FIGS. 8 through 10, FIGS. 8-10, the retainer 14 may be press-fitting onto the support 18 of the anchor 12. Specifically, in operation, the anchor 12 may be driven or otherwise buried into the ground 200 at a desired location (e.g., a trench dug between a garden bed and a lawn). The recess 52 of the retainer 14 may then be press-fit onto the pin 32 of the support 18 such that the catch 49 of the retainer 14 may engage the lip 36 of the pin 32 and the bottom surface 46 of the retainer base 38 may rest on the top surface 34 of the support 18. Thereafter, edging material 300 may be passed though the channel 56 between the plates 40, 42 of the retainer 14 so that the hook 308 of the edging material 300 may be retained between the plates 40, 42 of the retainer.

Referring now to FIG. 5, it will be appreciated that the anchor 12 of the guide 10 may be constructed entirely as an elongated post 16'. The post 16' may have a Y-shaped or similar cross-section formed from three elongated flanges 20' that may extend radially from a center axis 22' of the post 16'. Each end 76, 77 of each flange 20' of the post 16' may be tapered to aid the user in driving the post in the ground 200. Further, each flange 20' may have a notch 78 defined in the flange 20' proximate one end 76. In operation, the notch 76 may be engaged by the catch 49 of the retainer 14 so that the retainer 14 may be rotatably mounted to the post 16'.

Referring now to FIG. 6, as described above the retainer 14 may be used to secure one or more lengths of edging material 300, 300'. Specifically, the ends 312, 314 of two lengths of edging material 300, 300' may be inserted into the retainer 14 and then secured by one or more fasteners 74.

Referring now to FIG. 7, the post 16 of the anchor 12 may also included a plurality of threads 82. Further, a flange or plate 84 may extend concentrically (or radially) from the base 30 of the support 18. The plate 84 may be constructed as a separate part from the base 30, or it may be molded integral with the base 30. In operation, the threads 82 may assist a user to "screw" or "unscrew" the anchor 12 from the ground 200. The plate 84 may function to increase the amount of soil that may be place over the guide 10 when in use. It being appreciated that more soil may contribute to a greater weight/force being exerted on the guide 10 to further aid the retention of the guide 10 in the ground 200.

Having thus described carious embodiments for the edging guide, it will be understood that certain additional embodiments will become apparent to those of skill in the art that do not depart from the skill of the appended claims.

The invention claimed is:

1. A guide for edging material comprising:
an anchor including a post and a support, the support being positioned on an end of the post and defining a first mounting member; and
a retainer for securing edging material, the retainer including an edging material receiving portion and a second mounting member, the second mounting member being mounted to the first mounting member, and the first and second mounting members being shaped so that the second mounting member is rotatable with respect to the first mounting member, whereby when the post of the anchor is positioned in the ground the retainer is rotatable about the support of the post so that the edging material receiving portion of the retainer is alignable with edging material to be receivable by the receiving portion; wherein the second mounting member comprises a base having an upper surface, a bottom surface and a sidewall having an exterior surface extending between the upper and bottom surfaces, and a recess being defined in the bottom surface of the retainer; wherein the sidewall includes a flexible clip defined by a pair of spaced apart grooves that extend though the exterior surface to the recess.

2. The guide of claim 1, wherein edging material receiving portion comprises a first retainer plate and a second retainer plate, each retainer plate extending from the second mounting member, at least one of the plates having a first portion and a second portion, and the plates being spaced apart to define a channel therebetween, the channel between the plates being wider in the space proximate the first portion than the space proximate the second portion.

3. The guide of claim 2, wherein the second retainer plate comprises a first substantially vertical portion that is mounted at one end to the second mounting member, a substantially horizontal cross-piece that extends toward the first plate from an opposite end of the first substantially vertical portion, and a second substantially vertical portion that extends from an end of the cross-piece that is opposite the end mounted to the first substantially vertical portion.

4. The guide of claim 2, wherein each plate includes a pair of horizontally spaced apertures, the apertures of the first plate being vertically offset from the apertures of the second plate.

5. The guide of claim 1, wherein the post comprises a plurality of flanges, each flange extending outward from a center axis of the post.

6. The guide of claim 1, wherein the support comprises a pin, the first mounting member comprises a lip on the pin, and the second mounting member comprises a catch operable to engage and cooperate with the lip.

7. A guide for edging material, in combination with a length of edging material, the combination comprising:
an edging guide having an anchor and a retainer, the anchor including a post and including a first mounting member, the retainer including a second mounting member and a first plate and a second plate that each extend from the second mounting member, the plates are spaced apart to define a channel having open sides and an open top, the first plate including a first portion and a second portion, with the first portion being spaced from the second plate a greater distance than the second portion so the channel between the plates is wider in a space proximate the first portion than a space proximate the second portion, the second mounting member being mounted to the first mounting member, and the first and second mounting members being shaped so that the second mounting member is rotatable with respect to the first mounting member, whereby when the post of the anchor is positioned in the ground the retainer is rotatable about the support of the post so that the edging material receiving portion of the retainer is alienable with edging material to be receivable by the receiving portion; and a length of edging material having a catch portion is positioned in the channel defined by the plates, the catch is dimensioned so that the catch is received in the channel in the space proximate the first portion, so that the edging material is retained against vertical movement out of the top of the channel; wherein the second plate comprises a first substantially vertical portion mounted at one end to the second mounting member, a substantially horizontal cross-piece extending toward the first plate from an opposite end of the first portion, and a second substantially vertical portion extending from an end of the cross-piece opposite the end mounted to the first portion.

8. The guide and material combination of claim 7, further comprising a fastener and wherein each plate includes an aperture, the aperture of the first plate being vertically offset from the aperture of the second plate, and the fastener extending through the aperture of the first plate, the edging material, and the aperture of the second plate to secure the edging material to the retainer.

9. The guide and material combination of claim 8, wherein the fastener extends through the aperture of the first plate, the edging material, and the aperture of the second plate in a downward orientation to secure the edging material to the retainer.

10. The guide and material combination of claim 7, comprising at least two lengths of edging material positioned in the retainer.

11. The guide and material combination of claim 7 wherein the post comprises a threaded post.

12. The guide of claim 7, wherein the first mounting member comprises a groove defined in the post, and the second mounting member comprises a tongue positioned on the retainer that is operable to engage and cooperate with the groove of the post.

13. The guide and material combination of claim 7, wherein at least one of the plates is resiliently mounted to the second mounting member so that the plate flexes relative to the second mounting member to allow for the vertical insertion of edging material through the top of the channel.

* * * * *

UNITED STATES PATENT AND TRADEMARK OFFICE
CERTIFICATE OF CORRECTION

| | | |
|---|---|---|
| PATENT NO. | : 8,464,464 B2 | Page 1 of 1 |
| APPLICATION NO. | : 12/027749 | |
| DATED | : June 18, 2013 | |
| INVENTOR(S) | : Rosaen | |

It is certified that error appears in the above-identified patent and that said Letters Patent is hereby corrected as shown below:

In the Specification:

Column 1, line 17, Delete "look", Insert --hook--

Column 1, line 26, Delete "particular", Insert --particularly--

Column 2, line 59, Delete "59", Insert --52--

Column 5, line 5, Delete "alienable", Insert --alignable--

Signed and Sealed this
Nineteenth Day of May, 2015

Michelle K. Lee
*Director of the United States Patent and Trademark Office*